United States Patent

[11] 3,591,915

| [72] | Inventors | John A. Roberts<br>North Chelmsford;<br>Peter R. Roberts, Groton; Lee B. Danzey,<br>Canton, all of, Mass. |
|---|---|---|
| [21] | Appl. No. | 823,823 |
| [22] | Filed | May 12, 1969 |
| [45] | Patented | July 13, 1971 |
| [73] | Assignee | Brunswick Corporation |

[54] METHOD OF MAKING ORIFICE STRUCTURE
26 Claims, 25 Drawing Figs.

[52] U.S. Cl. ................................................. 29/417,
29/420.5, 29/423, 29/481
[51] Int. Cl. ......................................................B23p 17/00
[50] Field of Search............................................. 29/417,
423, 420.5, 481, 473.3, 474.3; 148/4; 72/264

[56] References Cited
UNITED STATES PATENTS

| 90,322 | 5/1869 | Vanstone | 29/481 |
|---|---|---|---|
| 2,499,977 | 3/1950 | Scott | 148/4 |
| 2,628,417 | 2/1953 | Peyches | 29/423 |
| 2,947,078 | 8/1960 | Pflumm et al. | 29/481 X |
| 3,066,403 | 12/1962 | Brauchler | 29/420.5 |
| 3,205,692 | 9/1965 | Kemppinen et al. | 29/423 X |
| 3,355,795 | 12/1967 | Clark | 29/481 |

*Primary Examiner*—John F. Campbell
*Assistant Examiner*—Victor A. DiPalma
*Attorneys*—Donald S. Olexa and Jerome M. Teplitz ABSTRACT: An orifice structure has one or more passages capable of controlling the amount of fluid that flows therethrough with the passage having an effective diameter ranging from 5 mils to 1 micron. The thickness of the orifice structure is at least 10 times greater than the effective passage diameter and the wall thickness of the structure is at least 5 times greater than the effective passage diameter. A general method of providing the orifice structure is to constrictively reduce the cross section of two or more material portions with a sacrificial element inserted therebetween which is also reduced in cross section. During constriction the portions are integrated into a homogenous material. After constriction the structure is cut to preselected lengths and shapes and the sacrificial element is removed therefrom. When two or more sacrificial elements are used in a parallel relationship then two or more parallel passages can be provided.

PATENTED JUL 13 1971
3,591,915
SHEET 1 OF 6
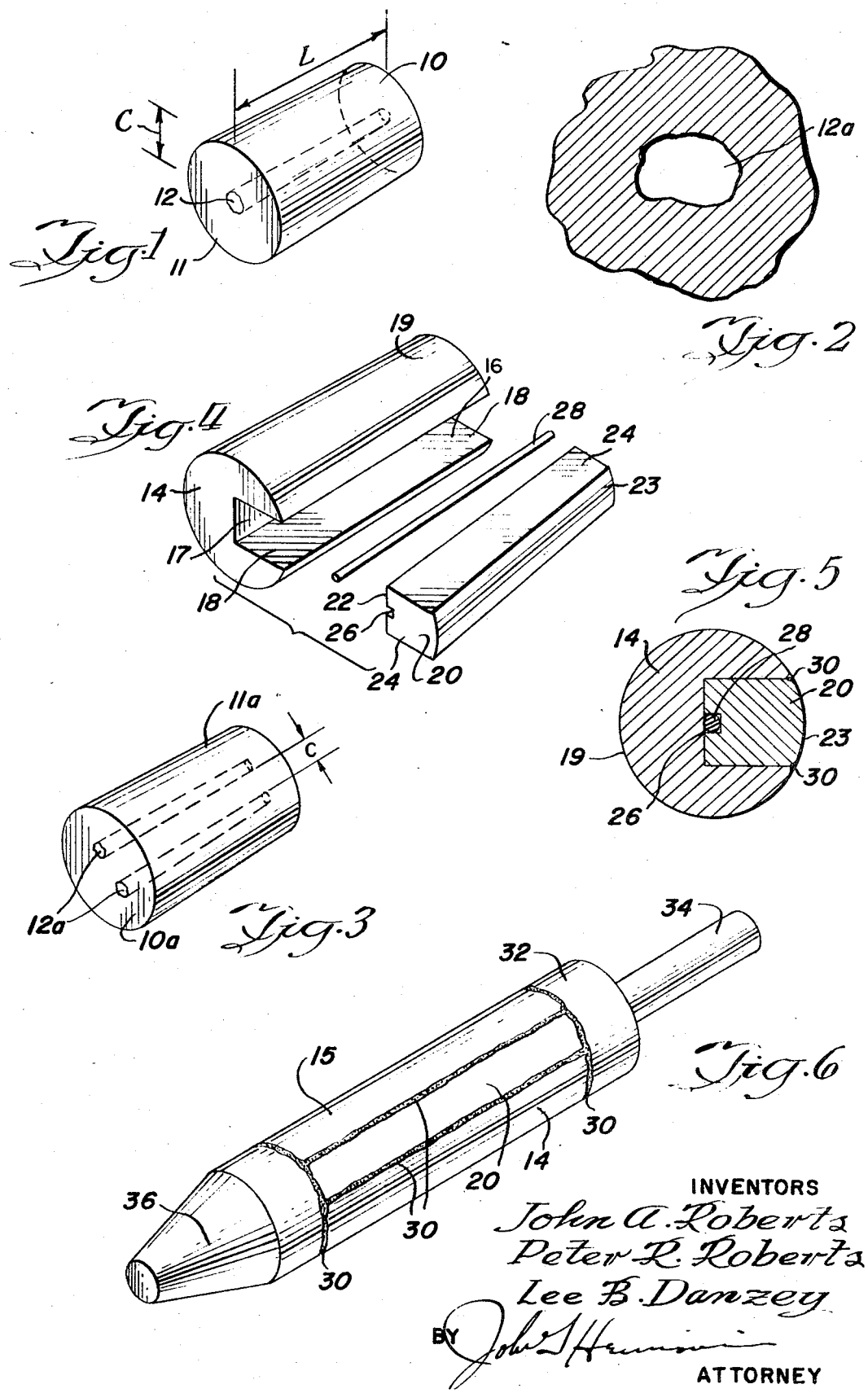

PATENTED JUL 13 1971
3,591,915
SHEET 2 OF 6
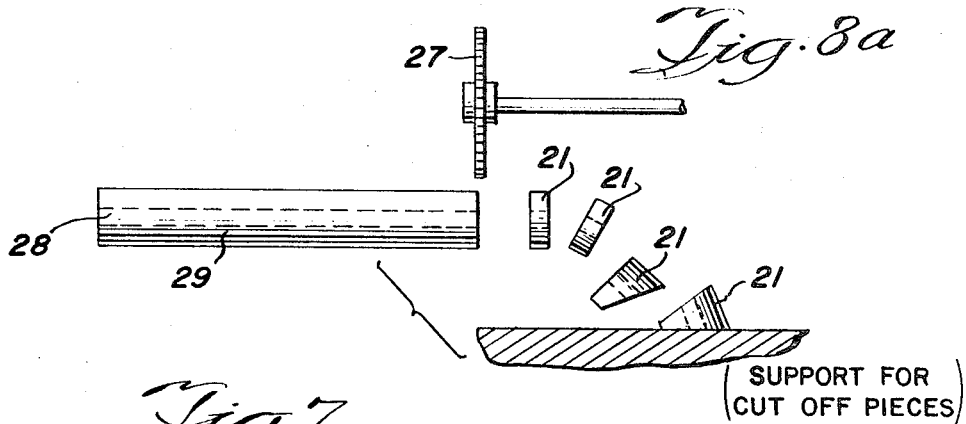
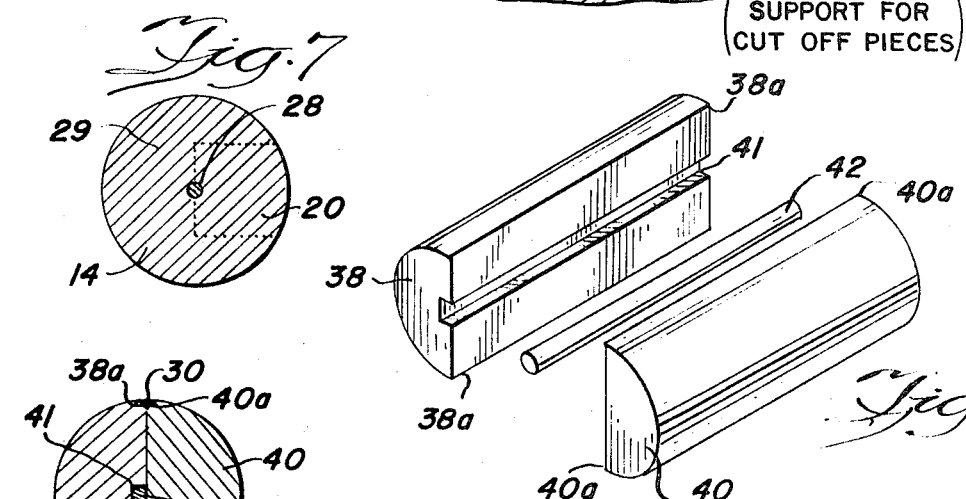
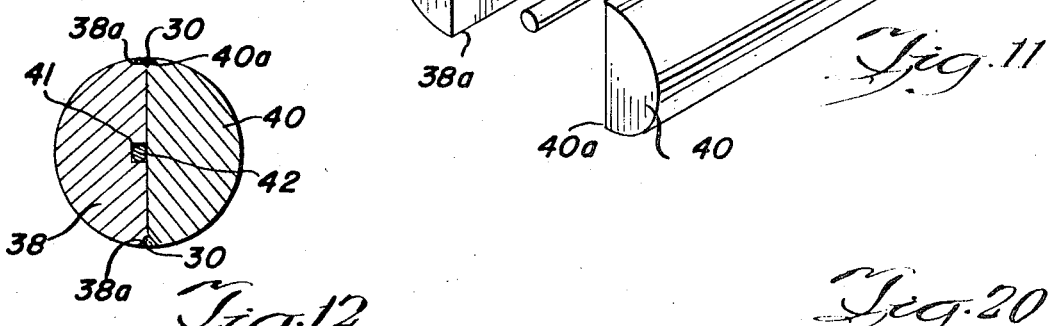
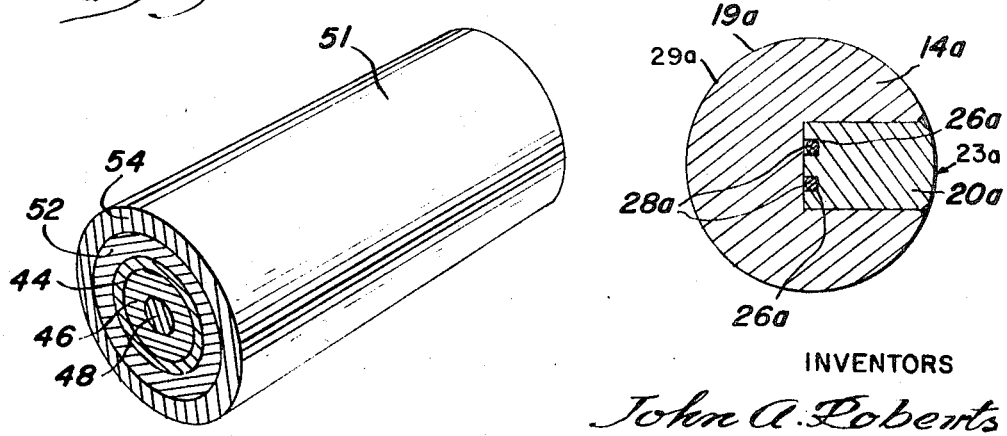
INVENTORS
John A. Roberts
Peter R. Roberts
Lee B. Danzey
BY John S. Hu
ATTORNEY 3,591,915

METHOD OF MAKING ORIFICE STRUCTURE

BACKGROUND OF THE INVENTION

1. Field of the Invention

This invention is in the field of orifice structures, and more particularly, is an orifice structure formed by integrating two or more portions into one homogeneous portion.

2. Description of Prior Art

During the past few decades great strides have been made in putting passages in thermoplastic materials such as glass, metals, plastics, etc. These technological advances include methods of forming passages such as laser beam drilling, diamond drilling, electrochemical drilling, etc. However, the small passages that these methods can form do not have parallel sides when the thickness of the material is several times greater than the passage diameter. This is especially true when the diameter of the passage is smaller than 10 mils. By using these known methods to form small diameter passages in materials having thicknesses over 10 times the diameter of the passages, the passages so formed have nonparallel sides. A cross section of a passage indicates that the hole is truncated and that the shape and size of the passage on one surface of a pair of parallel surfaces differs greatly from the size and shape of the passage on the other parallel surface. In order to have good orifice structure of small size, the prior art techniques are unable to produce a passage having an effective diameter of under 5 mils in materials over 50 mils thick. The methods taught by the prior art are also unable to consistently produce uniform size passages.

It has been old in the art to make orifice plates with passages having an effective diameter greater than 5 mils in materials thinner than 50 mils. By using the prior art methods it is possible to make orifice plates with passages smaller than 5 mils, as long as the plates are much thinner than 50 mils. However, if the material is over 50 mils thick it is not possible to put a parallel-sided passage smaller than 5 mils therein.

When the hereinabove methods are used to make flow plates, the nonparallel sides, the truncated hole shaped and the uncontrollable size variations of the passages cause such orifice plates to provide inconsistent flow rates.

SUMMARY OF THE INVENTION

This invention relates to orifice structures and is concerned with a new and novel structure that has orifices less than 5 mils in diameter and an aspect ratio greater than 10.

The present invention comprehends an orifice structure with one or more accurately sized passages each having an effective diameter of under 5 mils while the wall thickness of the structure is greater than 5 times the effective diameter of the passage. Several methods can be employed to make the orifice structure such as cold- and/or hot-working two or more material portions that are secured together and then constrictively reduced with a sacrificial element located therein and later removed therefrom. If the portions are metal then each embodiment of the orifice structure has a homogeneous crystalline microstructure.

A gun-drilled billet with one or more holes can be provided with an intermediate composite placed in the holes with the sacrificial element not yet removed from the composite. This billet can be constrictively reduced integrating the intermediate composite into the billet to form a continuous homogeneous material and further reducing the size of the sacrificial element. It is possible to provide a large external size material with one or more very small passages such as, for example, a 1 inch outside diameter disc of stainless steel, 60 mils thick, with one or more passages therein, therein, each passage having an effective diameter of 6 microns.

Thus, a principal feature of the present invention is the provision for a new and improved orifice structure.

Another feature of the invention is the provision for an orifice structure having at least two portions constrictively integrated into a homogeneously uniform material.

Still a further feature of the invention is the provision for a method of making an orifice structure of powder metal.

A further feature of the invention is the provision of such a structure substantially free of random porosity.

A further feature of the invention is the provision of an orifice structure comprising a powder matrix constrictively integrated to provide a structure with zero percent porosity.

Still another feature of the invention is the provision for an orifice structure having a passage with an effective diameter range from 5 mils to 1 micron.

Yet another feature of the invention is the provision for such a structure wherein the thickness is at least 10 times the effective diameter of the passage.

Still another feature of the invention is the provision for an orifice structure comprising at least two metallic portions integrated together and surrounding the passage.

A still further feature of the invention is the provision for an orifice structure having at least two passages.

Still another feature of the invention is the provision for an orifice structure made from a thermoplastic material.

Yet another feature of the invention is the provision for such an orifice structure wherein said thermoplastic material may be glass, metal, metal alloys, plastic, etc.

Another feature of the invention is the provision for a method of making an orifice structure by encapsulating a sacrificial element by powdered metal particles.

A further feature of the invention is the provision for a metallic orifice structure made from constrictively integrated material having a homogeneous microstrucrure surrounding the orifice.

A yet further feature of the invention is the provision for a method making an orifice structure by constrictively integrating two or more portions to form a homogeneous material.

The above and other further objects and features will be more readily understood in the detailed following description and accompanying drawings.

BRIEF DESCRIPTION OF THE DRAWINGS

FIG. 1 is a perspective view of an orifice structure;

FIG. 2 is a cutaway view of the surface cross section of a passage;

FIG. 3 is a perspective view of another embodiment of the structure;

FIG. 4 is a perspective exploded view of one embodiment;

FIG. 5 is a cross-sectional view of FIG. 4 assembled;

FIG. 6 is a perspective view of an assembled billet;

FIG. 7 is a cross-sectional view of the integrated composite of FIG. 5;

FIG. 8a is an elevation view of a composite and the pieces cut therefrom;

FIG. 11 is a perspective exploded view of another embodiment of the invention;

FIG. 12 is a cross-sectional view of FIG. 11 assembled;

FIG. 16 is a cross-sectional view of another assembled embodiment of the invention;

FIG. 20 is a cross-sectional view of an assembled embodiment of the invention;

DESCRIPTION OF THE PREFERRED EMBODIMENTS

Figure 8:
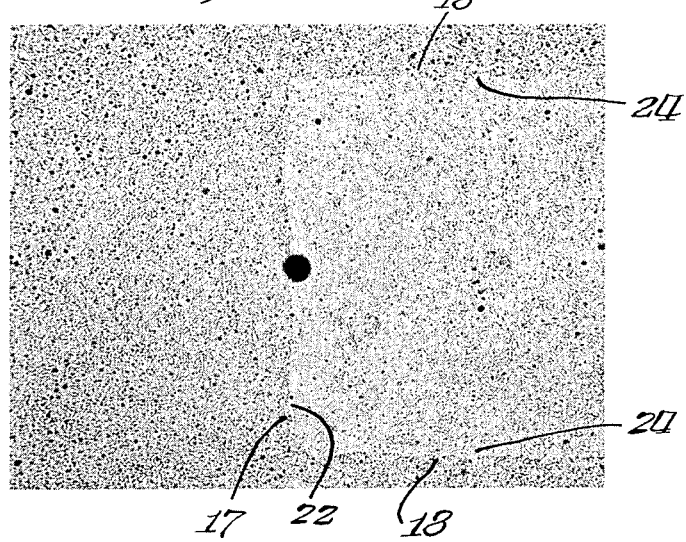
FIG. 8 is a photomicrograph of FIG. 7.

In one preferred embodiment of the invention as disclosed in the drawings, an orifice structure 10 is shown in FIG. 1. The structure 10 has a passage or hole 12 therethrough. The cross section of the passage can be substantially circular, square, rectangular, triangular or any substantially definite shape or indefinite shape as desired. Illustratively, an example of an indefinite passage shape is shown in FIG. 2 wherein the cross section of the passage 12 has no regular geometric shape. If the passage 12 is substantially circular in cross section then the effective diameter of the passage 12 will be the diameter of the circle. However, if the shape of the passage 12 is irregular as shown in FIG. 2 then the effective diameter of this passage 12 is calculated by measuring the cross section area of the hole 12; for example, by using a planimeter on a magnified image of the section, and the absolute numerical value of this section determined from the known magnification factor is given to an equivalent circle. The diameter of this equivalent circle is the effective diameter of the hole 12.

The orifice structure 10 with a passage 12 can have effective passage diameter ranging from 100 mils to 1 micron, a structure thickness or length L ranging from 10 microns to 50 inches and a wall thickness C of at least 5 times the effective passage diameter. The material comprising the structure 10 is a homogeneous material. In another embodiment of this invention as shown in FIG. 3, there are two passages 12a which are separated by a distance C which is at least five times larger than the effective diameter of the larger passages 12a. The passages 12a can have different effective diameters.

It is fully contemplated that there can be more than one passage in the orifice structure. However, where a very large number of passages are desired with a thin spacing therebetween reference should be made to the Roberts and Roberts U.S. Pat. application Ser. No. 778,679, filed Nov. 25, 1968, and owned by the assignee hereof with the disclosure thereof incorporated herein.

The orifice structures 10 or 10a each comprise a solid homogeneous material with the open passage 12 or passages 12a.

The passage structure may be made from any thermoplastic material such as metal, glass, plastic, etc. Illustratively, shown in FIG. 4 is a cross section of the slotted rod portion 14 having a slot 16 with a slot face 17 and slot sides 18. THe rod portion 14 is shown as having a generally circular external shape 19, however, any convenient external shape can be used. The rod insert portion 20 fits snugly into the slot 16 of the rod portion 14 with the rod insert sides 24 mating with the slot sides 18, the insert face 22 adjacent to the slot face 17 and the outer surface 23 of the insert portion 20 conforming substantially evenly with the surface contour 19 of the rod portion 14. The insert portion 20 has a small groove 26 in the insert face 22 which creates a passageway when the two portions are assembled. A sacrificial element 28 is positioned in the passageway or groove 26 as shown in FIG. 5. The insert portion 20 is secured at junction 30 to the rod portion 14 by any of a number of different means such as an adhesive, bonding, welding, cementing, etc. depending on the type of material used for the insert portion 20 and the rod portion 14. Generally, the portions 14 and 20 are made of substantially the same material. As shown in FIG. 6 a nose cone 36 is secured by similar means at junction 30 to the assembled portions 14 and 20 and end cap 32 is secured by similar means at junction 30 to the other end of the assembled portions 14 and 20. The end cap 32 has an evacuation tube 34 secured thereto. These parts comprise the billet 15 when assembled.

Depending upon the material used in comprising the billet 15, a vacuum of varying degree may be pulled on the billet through tube 34 with the tube 34 being sealed thereafter to maintain the vacuum in the billet 15. The billet is then constricted in such a manner that the cross section of the billet 15 is reduced in size while the length of the billet is increased. Any suitable constricting means can be employed that is compatible with material being used, such as drawing, swaging, rolling, extruding, etc. One or more constricting steps may be used and it is fully contemplated that any combination of constricting steps may be used to reduce the billet to the desired size. A cross section of the billet 15 after constriction is shown in FIG. 7 wherein the composite 29 no longer exhibits the original separate portions, rod portion 14 and insert portion 20, but one homogeneous material with the two portions constricted around the sacrificial element 28. During constricting the two portions are integrated into a unitary structure.

Constriction of the billet may take place at elevated temperatures, room temperature, i.e. approximately 70° F., or subroom temperatures or any combination thereof depending upon the material being used. It is fully contemplated that heat treatment step or steps may take place prior to, during or after the constricting step or steps.

After constricting, the nose cap 36 and the end cap 32 with the evacuation tube 34 are removed, leaving the long composite billet 29. The composite billet 29 can be cut into any desired length pieces as shown in FIG. 8a such as by slicing with any suitable means, i.e., cut off wheel 27. The pieces 21 may be sliced transverse to the billet's longitudinal axis or at any acute or obtuse angle with respect to the axis. It is fully contemplated that the external geometric shape of the piece 21 may be any desired shape to accommodate any desired holding structure or support.

The sacrificial element 28 can be removed by any convenient means such as leaching, electrochemical dissolution, melting, melting with the application of pressure, etc. depending upon the material that comprises the sacrificial element 28 and the integrated composite structure 29. Thus, the orifice structure so produced is the structure 10 of FIG. 1 with the sacrificial element 28 removed to define the substantially parallel-sided passage 12. In order to accurately size the passage or orifice the sacrificial element material must be compatible with the material comprising the rod 14 and insert 20 so that during constricting the sacrificial element 28 will be reduced substantially proportional with respect to the reduction of the rod and insert.

When the rod portion 14 and the insert portion 20 are made from a metal or a metal alloy such as stainless steel and sacrificial element 28 is made from another metal or metal alloy such as a copper-nickel alloy, it has been found that during constricting the surface boundaries between the two portions disappear forming a homogeneous material with a continuous metallic microstructure where the portion boundaries had previously existed. Illustratively, FIG. 8 is a photomicrograph taken at 100 times magnification showing the grain structure of the composite orifice structure 29 with a passage or orifice 12 and the sacrificial element 28 removed.

Figure 9:
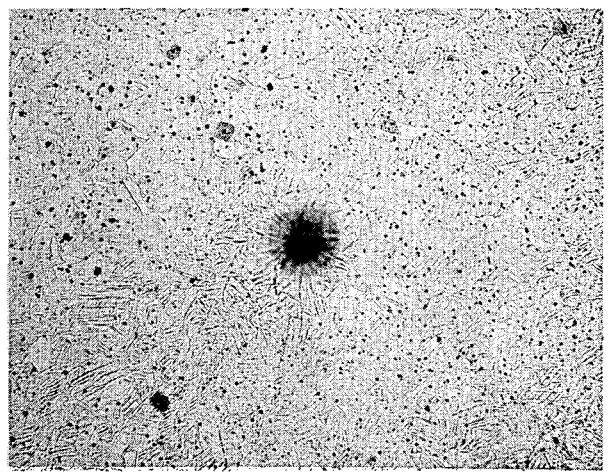
FIG. 9 is a photomicrograph of FIG. 7.
Figure 10:
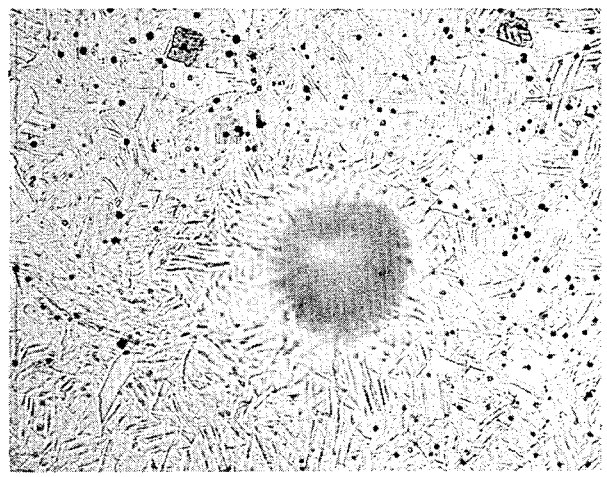
FIG. 10 is a photomicrograph of FIG. 7.

It is well known to those skilled in the art that a specific metal alloy with a grade designation such as Type 304 stainless steel or AISI C 1040 can have an acceptable variation of constituents within the grade. The microstructure of rod portion 14 and the insert portion 20 appear in FIG. 8 to be two materials with boundaries at their respective interfaces 18–24 and 17–22. It is also well known in the art that two or more pieces of the same grade metal or metal alloy will often show differences in reflectivity when polished and etched for metallographic examination if the pieces examined originated from different heats of the same grade. It is this phenomenon that creates the illusion that the two portions are not integrated into one homogeneous material. Fig. 9 is a photomicrograph taken at 500 times magnification of the same metallic orifice structure 29 as shown in FIG. 8. And, Fig. 10 is a photomicrograph taken at 1,000 times magnification of the same orifice structure 29 as shown in FIGS. 8 and 9. At these higher magnifications of the orifice structure the complete integration of the two portions is shown by the continuous homogeneous microstructure.

By creating unity of material it is possible to form a substantially parallel-sided passage in the structure wherein the effective passage diameter ranges from 50 mils to 1 micron. At the same time the aspect ratio—the ratio of the length of the passage to the effective diameter of the passage—can be in the range of thousands of times, depending on the material used for the structure and the sacrificial element. In some instance trace amounts of the sacrificial material remain on the substantially parallel walls of the passage or orifice.

Figure 13:
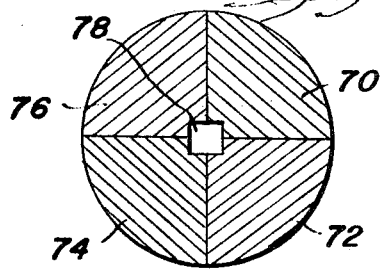
FIG. 13 is a cross-sectional view of another assembled embodiment of the invention.
Figure 14:
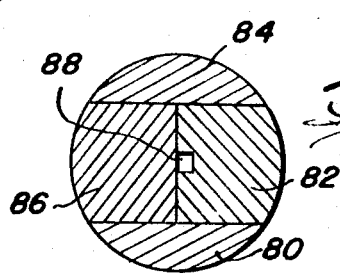
FIG. 14 is a cross-sectional view of another assembled embodiment of the invention.

In another embodiment of the invention as shown in FIG. 11 and FIG. 12 where two substantially semicircular portions 38 and 40 are secured together at the exterior edges 38a and 41a of their mating interface surfaces. Any desired securing means such as a weld, adhesive, cement, etc. may be used at junction 30. A sacrificial element 42 is placed in the groove 41. The two portions 38 and 40 surrounding the element 42 can be formed into a billet similar to the billet 15 as shown in FIG. 6. A final orifice structure similar to the one as shown in FIG. 1 can be provided by constrictively working this billet. Other geometric configurations that can be employed achieving the same final results such as the composite buildup of four substantially quadricircular portions 70, 72, 74, and 76 with a groove 78 therein shown in FIG. 13 or the composite buildup shown in FIG. 14 with portions 80, 82, 84, and 86 with a groove 88 therein.

Figure 15:
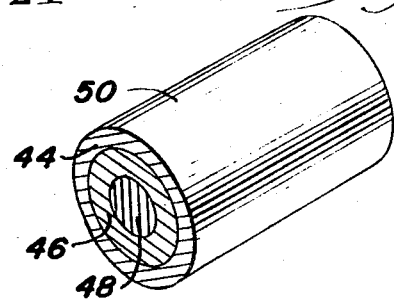
FIG. 15 is a cross-sectional view of another assembled embodiment of the invention.

Another embodiment of the invention is shown in FIG. 15 wherein two tubes 44 and 46 substantially of the same materials are concentrically arranged into a composite 50 with a sacrificial element 48 therein. Another composite 51 is shown in FIG. 16 where the tubes 44 and 46 are further concentrically encased by the tubes 52 and 54. The original sacrificial element 48 remains surrounded by tube 46 in either composite. Composites 50 and 51 can each be provided with a nose cone and an end cap having an evacuation tube in order to make a billet similar to billet 15 of FIG. 6. Both of the billets, as formed, can be processed in the same manner as billet 15 yielding a long continuous composite of homogeneously integrated material, together with a sacrificial element. The long composite can then be cut into pieces of any desired length or shape similar to pieces 21 in FIG. 8a with sacrificial element removed thereafter.

Figure 17:
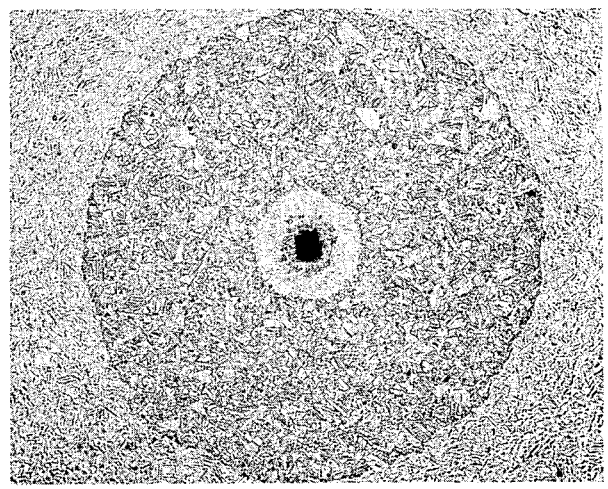
FIG. 17 is a photomicrograph of FIG. 16.
Figure 18:
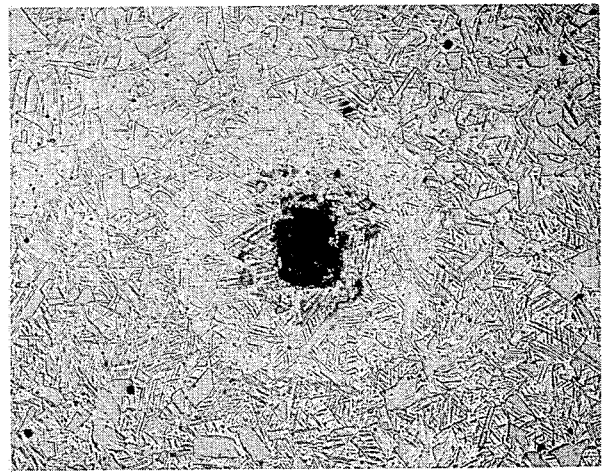
FIG. 18 is a photomicrograph of FIG. 16.
Figure 19:
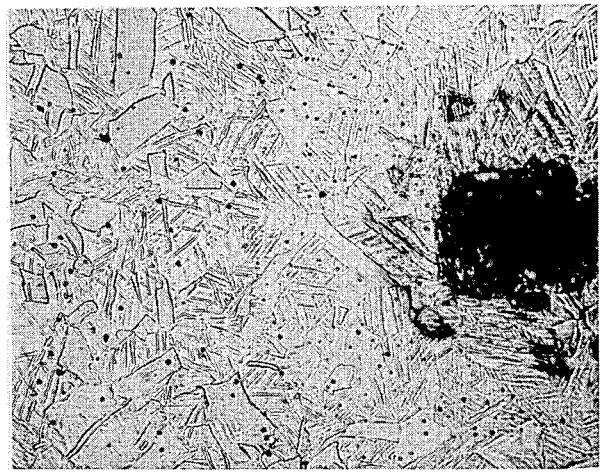
FIG. 19 is a photomicrograph of FIG. 16.

For example, FIG. 17 is a photomicrograph of stainless steel tubes 44, 46, 52, and 54 constrictively integrated together starting from the posture of composite 51 with the sacrificial material 48 removed. The photomicrograph is taken at 200 times magnification. This photomicrograph appears to indicate only a minimum amount of integration between the tube boundaries. FIG. 18 is a photomicrograph taken at 500 times magnification and FIG. 19 is a photomicrograph taken at 1,000 times magnification of the same etched metallographic sample as FIG. 17. These photomicrographs clearly indicate complete diffusion of the tubes into a homogeneous material. Although there is contrast between the original tubes shown, the crystalline structure of the material is homogeneous which is exemplified by the continuous grains in the microstructure.

In another embodiment of the invention as shown in FIG. 20, the two portions 14a and 23a surround two grooves 26a having sacrificial elements 28a therein. This composite 29a can be processed in a similar manner to the other composites yielding an orifice structure such as the structure 10a of FIG. 3. Similarly, this composite 29a can be constrictively integrated into one homogeneous material defining two passages. It is fully contemplated that any number of passages may be provided as desired.

Figure 21:
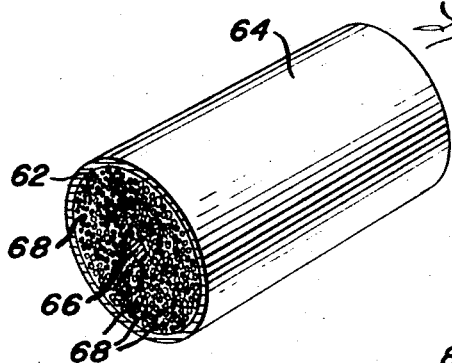
FIG. 21 is a perspective view of another embodiment of the invention.

Another embodiment of the invention shown in FIG. 21 where a cross section of a billet 64 comprises a metal enclosure portion 62 packed with powder metal particles or portions 68 surrounding a sacrificial element 66. Each powder metal portion is designated by the reference number 68. After the enclosure 62 is hydrostatically packed with portions 68 which surround the sacrificial element 66, a billet is assembled having a nose cone and an end cap with an evacuation tube similar to the billet 15 of FIG. 6. The billet is processed similar to billet 15 with sufficient pressure and temperature used during the constricting process to provide a substantially 100 percent dense metal matrix member from the compacted powder metal portions 68. The metal matrix member composite so formed has a substantially fully integrated homogeneous continuous microstructure and can be cut to any preselected shape similar to composite 29 in FIG. 8a. The sacrificial element 66 can be removed by any suitable process similar to those described above. As desired, the enclosure 62 may be removed by means similar to those used for removal of the sacrificial filament or any suitable mechanical metal-removing means or the enclosure 62 can be left surrounding the metal matrix member. If the enclosure portion 62 is made from substantially the same metal or metal alloy as the portions 68, then the enclosure 62 can be constrictively integrated with the powder portions 68 forming a unified homogeneous metal composite member. The constricted composite can be sliced into pieces similar to the pieces 21 of the billet 15 as shown in FIG. 8a.

Figure 22:
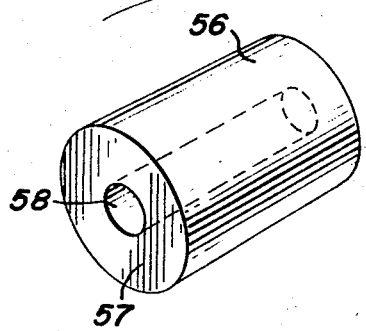
FIG. 22 is a perspective view of a gun-drilled rod.
Figure 23:
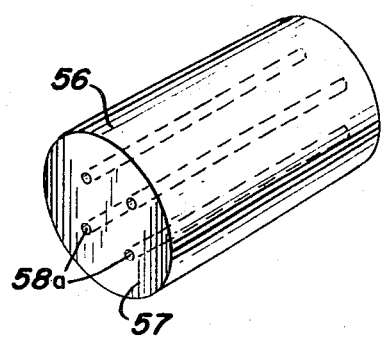
FIG. 23 is a perspective view of a gun-drilled rod having a plurality of holes.
Figure 24:
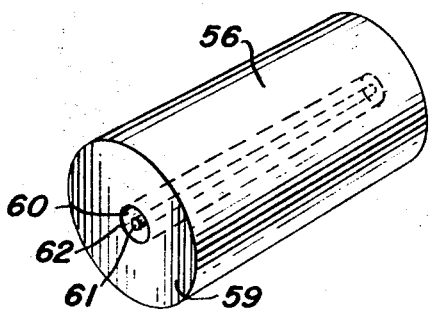
FIG. 24 is a perspective view of the gun-drilled rod of FIG. 22 with a composite therein.

In another embodiment of the invention, as illustrated in FIG. 22, surface 57 is a cross section of the rod 56 having a hole 58 therein. It is fully contemplated that the rod 56 may have any number of substantially parallel holes 58 as shown in FIG. 23. As shown in FIG. 24, the rod 56 has an integrated constricted composite 60 placed therein; and can be the same as the constrictively integrated composite 29 (or any of the composites within the scope of this invention) or similar thereto. The rod 56 and the integrated portions 62 of the composite 60 are made from substantially the same material. After the composite 60 is inserted into the rod 56, the rod 56 can be fashioned into a billet similar to billet 15 of FIG. 6 with a nose cone, and an end cap with evacuation tube. The billet so formed is precessed in a manner similar to billet 15 and thereby forming composite 59. During the constrictive reduction thereof the cross-sectional area of billet 59 is reduced and concommitantly the cross section of the composite 60 with the sacrificial element 61 therein is also substantially proportionately reduced. Also during constriction the integrated portions 62 of the composite 60 and rod 56 are constrictively integrated into a homogeneous microstructure. The billet 59 can be cut into pieces similar to pieces 21 of composite 29 shown in FIG. 8a. The sacrificial element can be removed from the pieces similar to any of the means described hereinbefore. The rebundling of the composite 60 into a drilled billet rod 56 and the processing thereof while the sacrificial element 61 remains therein, provides means for producing orifice structures similar to structure 10 as shown in FIG. 1. Thus, such a process can provide a structure with a large external size, i.e., a 1-inch diameter, and having an orifice or passage therein with a small effective diameter, i.e., 6 microns. It is fully contemplated within the scope of this invention that there can be one or more orifices or passages in the structure by starting with rod 56a of FIG. 23 and that the effective diameter of these orifices can vary, as desired.

It is also within the scope of this invention that the composite 60 can comprise intermediate billets such as those shown in FIGS. 5, 12, 13, 14, 15, 16, 21. When such an arrangement is used on the composite 60 the portions are constrictively integrated together and also integrated with the rod portion 56 to form one homogeneous microstructure concurrently.

It is also contemplated that a cast composite structure can be used as composite 60 in the billet 59.

In all the embodiments described herein the sacrificial element can be any desired size and shape and may be made from any material that is compatible with the portions' material. Some of the preferred embodiments that may be used for the sacrificial element may be wire, filaments, powdered metal, rods, glass, etc. as desired.

A specific example of the orifice structure forming process embodying the invention is as follows:

EXAMPLE

A 1½-inch diameter, Type 304 stainless steel rod portion was machined to a 1.450-inch diameter similar to the rod portion in FIG. 4. A parallel-sided slot was cut into the rod, the centerline of the slot bisecting the circle section. A rectangular-sectioned insert portion was machined from Type 304 stainless steel to fit snugly into the machined slot. A rectangular groove of approximately 0.012 inch by 0.015 inch was cut into one face of the rectangular section insert. When the extrusion billet was assembled, this groove was along the axis of the billet. Prior to assembly, all pieces were cleaned. The rectangular insert was secured to the rod by a bead weld. The nose cone was welded to the front of the rod assembly with no portion of the weld exceeding 1.450 inches on the diameter of the assembled rod. A sacrificial element having a 0.0089-inch diameter and made from Monel 400 metal was inserted into the 0.012-inch by 0.015-inch channel formed when the rod and the insert were assembled. Opposite the nose cone end, and end cap with an evacuation tube was welded to the billet. The welded assembled billet was leak tested. The billet was heated to a temperature of approximately 750–800° F., the billet evacuated and then sealed. The evacuated billet was heated to 2,100° F. for approximately 90 minutes and extruded through a die having a 0.306-inch diameter. The extruded nose cone and end cap were cropped from the extruded billet. The billet was then reduced to a diameter of 0.128 inch by progressive wiredrawing passes wherein the drawing dies had diameters of 0.289 inch, 0.257 inch, 0.229 inch, 0.204 inch, 0.182 inch, 0.162 inch, 0.144 inch and 0.128 inch. The billet was subjected to an anneal at 1,800° F. for 400 seconds prior to one of the intermediate wiredrawing passes. The final pass that produced the 0.128 inch diameter integrated billet was also a straightening pass. The rod was then sliced into 0.053-inch thick pieces. The sacrificial material was removed from the pieces by leaching out the Monel 400 in a bath of 50 volume percent $HNO_3$ at 150° F. for 2 hours. The orifice or passage produced has an effective diameter of approximately 19 microns.

It is fully contemplated that any elongated thermoplastic material portions can be constrictively integrated together. The composite portion can have any size of passage of passages therein, provided that sacrificial elements of a preselected size are present in the groove or grooves defined by the portions. Therefore, constrictively reducing the cross-sectional dimension of both the portions and the element while integrating the portions into one homogeneous material will yield the desired structure. Thus a structure formed by constrictively integrating the material into a homogeneous structure will provide a structure wherein the original portion boundaries exhibit substantially the same strength after integration as the strength of the basic material.

Although many specific embodiments and variations of the invention have been described, many modifications and changes may be made therein without departing from the scope of the invention as defined in the appended claims.

We claim:
1. A method of making an orifice structure comprising the steps of:
   a. assembling at least two portions of material concentrically and having a common axis, one portion being an outer portion and one portion being an inner portion, said inner portion having a passage therein coaxial with the common axis;
   b. inserting a sacrificial element in the passage to form a billet;
   c. constrictively proportionately reducing the cross section of the billet in order to integrate the portions into a unitary structure; and
   d. removing the sacrificial element from the billet.
2. The method of claim 1 wherein said billet is heated prior to reduction.
3. The method of claim 2 wherein the maximum temperature is below the melting point of the parts of said billet.
4. The method of claim 2 wherein the maximum temperature is below the melting point of the eutectic compositions formable within said billet.
5. The method of claim 1 wherein said billet is cut into preselected pieces prior to removing the sacrificial element.
6. The method of claim 1 wherein said portions comprise metal.
7. A method of making an orifice structure comprising the steps of:
   a. assembling at least two first portions of substantially similar material having juxtaposed surfaces defining an interface therebetween and at least one passageway formed by the portions at the interface;
   b. inserting a sacrificial element in the passageway thereby defining a first billet;
   c. constrictively proportionately reducing the cross section of the first billet until the first portions form an integrated unitary structure;
   d. assembling at least two second portions of substantially similar material having juxtaposed surfaces defining an interface therebetween and at least one passageway formed by the portions at the interface;
   e. inserting said first billet in the passageway formed by the two second portions thereby defining a composite billet;
   f. constrictively proportionately reducing the cross section of all parts of the composite billet until the first portions and the second portions form an integrated unitary structure absent substantially of any structural interface between all of the portions; and
   g. removing said sacrificial element from said integrated structure.
8. The method of claim 7 wherein said billets are heated prior to reducing.
9. The method of claim 7 wherein said billets are heated between reducing steps.
10. The method of claim 7 wherein the billets are heated prior to reducing.
11. THe method of claim 10 wherein the maximum temperature is below the melting point of the parts of said billets.
12. The method 10 wherein the maximum temperature is below the melting point of the eutectic compositions formable within said billets.
13. THe method of claim 7 wherein said composite billet is cut into preselected pieces prior to removing the sacrificial element.
14. The method of claim 7 wherein said portions comprise metal.
15. A method of making an orifice structure comprising the steps of:
   a. compacting in a can powdered metal portions surrounding a sacrificial element therein thereby defining a contained billet;
   b. constrictively reducing the cross section of said billet to integrate the powdered metal portions into a matrix having a homogeneous microstructure with substantially zero percent porosity; and
   c. removing the sacrificial element from the integrated matrix.
16. The method of claim 15 wherein said integrated matrix is cut into preselected pieces prior to removing the sacrificial element.
17. A method of making an orifice structure having a substantially parallel-sided passage therein, said passage having an effective diameter of less than 250 microns wherein the length of the passage in the structure is at least 10 times greater than the respective diameter thereof and wherein the thickness of the structure surrounding the passage is at least five times greater than the respective diameter of the passage, comprising the steps of:
   a. assembling at least two portions of substantially similar material having juxtaposed surfaces defining an interface therebetween and having at least one passageway formed by the portions at the interface;
   b. inserting a sacrificial element in the passageway;

c. securing the portions together at the exterior surface of said interfaces to prevent relative movement therebetween and thereby forming a billet;
d. constrictively proportionately reducing the cross section of said billet until said portions form an integrated unitary structure absent of any interface between said portions; and
e. removing said sacrificial element from said integrated structure.

18. The method of claim 17 wherein said billet is heated prior to reduction.

19. The method of claim 18 wherein the maximum temperature is below the melting point of the billet.

20. The method of claim 18 wherein the maximum temperature is below the melting point of the eutectic composition formable within said billet.

21. THe method of claim 17 wherein said billet is cut into preselected pieces prior to removing the sacrificial element.

22. A method of making an orifice structure comprising the steps of:
   a. assembling at least two portions of substantially similar material having juxtaposed surfaces defining an interface therebetween and having at least two passageways formed by said portions at said interface, the passageways spaced apart at least five times the effective diameter of the largest passageway;
   b. inserting a sacrificial element in each of the passageways;
   c. securing the portions together at the exterior surfaces thereof to prevent relative movement therebetween and thereby forming a billet;
   d. constrictively proportionately reducing the cross section of the billet until the portions form an integrated unitary structure absent of any interface between the portions; and
   e. removing the sacrificial element from the integrated structure.

23. The method of claim 22 wherein the billet is heated prior to reduction.

24. The method of claim 22 wherein the maximum temperature is below the melting point of the parts of the billet.

25. The method of claim 22 wherein the maximum temperature is below the melting point of the eutectic composition formable within the billet.

26. The method of claim 22 wherein said billet is cut into preselected pieces prior to removing the sacrificial element.